Oct. 8, 1940.　　　　H. T. WHEELER　　　2,217,085
PROCESS OF MAKING PACKING MATERIALS
Filed March 2, 1936　　　　2 Sheets-Sheet 1

Harley T Wheeler
INVENTOR.
Jesse R. Stone
BY Lester D. Clark
ATTORNEYS.

Oct. 8, 1940.  H. T. WHEELER  2,217,085
PROCESS OF MAKING PACKING MATERIALS
Filed March 2, 1936  2 Sheets-Sheet 2
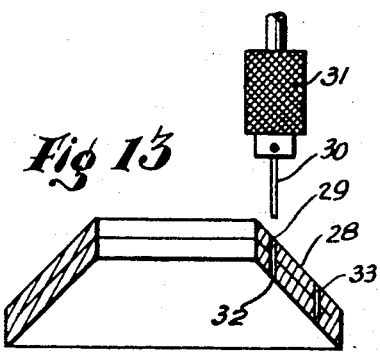
Fig 13
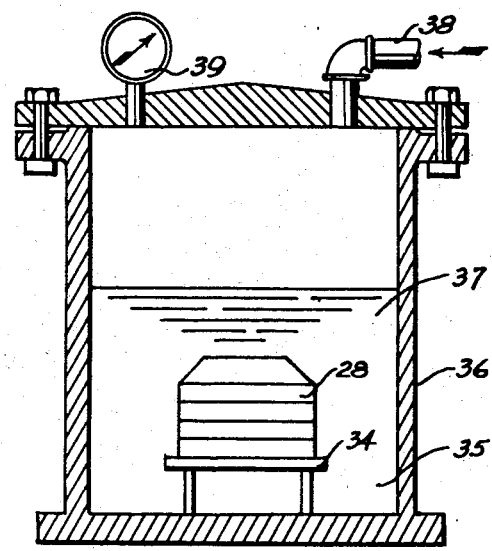
Fig 14
Fig 13A
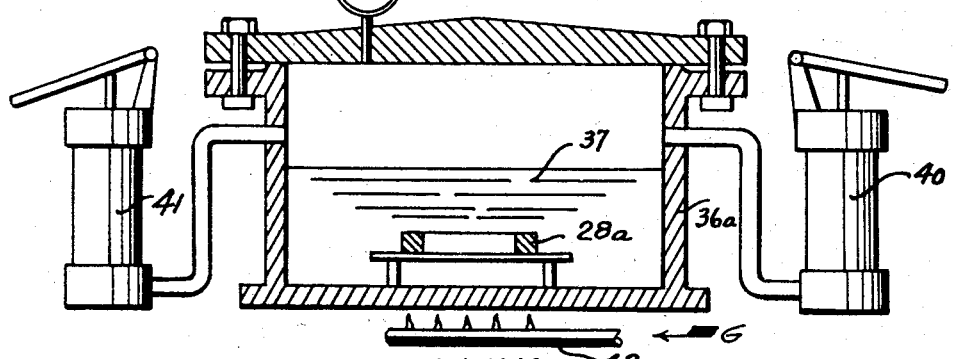
Fig 15
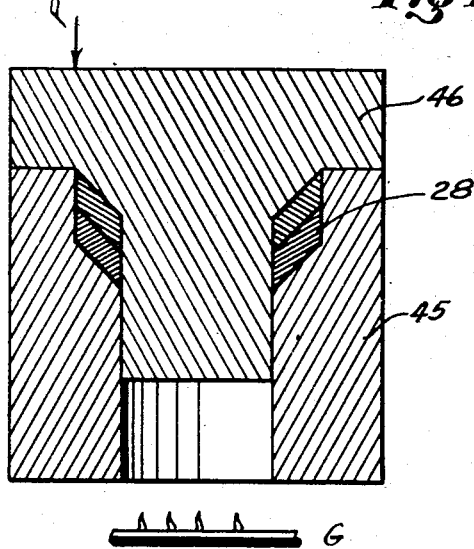
Fig 17
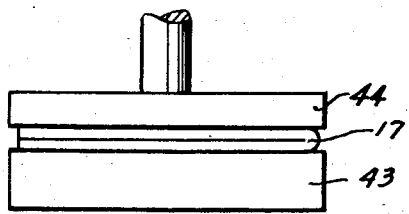
Fig 16
Harley T. Wheeler
INVENTOR.
Jesse R. Stone
Lester B. Clark
BY ATTORNEYS.

Patented Oct. 8, 1940

2,217,085

UNITED STATES PATENT OFFICE 2,217,085

PROCESS OF MAKING PACKING MATERIAL

Harley T. Wheeler, Dallas, Tex.

Application March 2, 1936, Serial No. 66,576

4 Claims. (Cl. 91—68)

My invention relates to packing materials such as packing rings for use in stuffing boxes, gaskets for general application and rings for pistons.

In the use of packing materials in places where they are subjected to the action of acids and corrosive liquids or high temperatures it is difficult to provide a ring which will stand up under such conditions and not deteriorate so rapidly as to be practically useless. Rubber which constitutes a very desirable material for use in the construction of packing deteriorates rapidly under the attack of acids or other corrosive liquids. Ordinarily petroleum distillates have a detrimental effect upon rubber packing and it becomes desirable to employ some protective material for the rubber in order to make it available for use under unfavorable conditions such as have been noted.

The painting and dipping of rubberized products with varnishes or synthetic resin solutions give but a slight protection in film form over the outer surface of the packing. This forms some protection against moisture, sunlight and contact of chemical solutions but such coatings are of no use for packing rings and gaskets which must resist chemical action while being subjected to great pressure or from friction due to contact of moving bodies.

Vulcanizable materials such as gum rubber cut by the usual solvents when applied to porous fabrics or mixtures form a coating around the various fibers of the packing materials but do not impregnate them after vulcanization. Even when rubberized porous fabrics are impregnated with viscid solutions of gums under pressure penetration of the porous materials does not occur although the rubber still acts as a flexible binder. Packing and gasket materials so rubberized have been used in the art for a long time but have not met the requirements of a packing material where a flexible packing impervious to chemicals is required. The chemicals penetrate the fibers and destroy them, allowing the rubber binder to collapse. The additions of a protective coating of varnish applied by dipping or painting does not protect the fibers so coated when the materials are subjected to friction.

In the production of a packing which may overcome these defects I have discovered that porous fibers bound together by vulcanized rubber and then thoroughly impregnated with any of a great variety of obtainable resinous solutions will become immune to any chemical solutions when polymerized and thus insure flexibility when placed under friction.

It is an object of the invention to provide a packing material so constructed as to be protected from chemical action.

I desire to impregnate porous materials with such vulcanizable materials as rubber and thus produce a flexible packing ring and to then further protect the ring with chemically resistant fluids such as synthetic resins and polymerizable varnishes and oils. The invention also includes the regulating of the method of impregnation so that any degree of impregnation from a thin film upon the surface to complete impregnation may be uniformly obtained. I desire to be able to force into the rubberized packing material a chemically resistant material which will protect the ring against deterioration in use for long periods.

The principal object of the invention is to provide a packing ring which will be flexible and maintain its packing characteristics even under the action of chemicals and corrosive materials and which will also resist wear under friction, or collapse under high pressures.

The further objects and advantages of the invention will more clearly appear from a description of the manner of treatment and application taken in connection with the drawings herewith.

In the drawings,

Fig. 13 illustrates a means for preparing the packing for treatment.

Fig. 13A is a partial plan view of a packing ring with openings therein and illustrating a step in the process of treatment.

Fig. 14 is a transverse section through a treating vat wherein one step of the process may be carried out.

Fig. 15 is a similar section through a treating tank illustrating the further treatment of the packing device.

Fig. 16 is a broken side elevation illustrating a step in the process of treatment.

Fig. 17 is a vertical section through a mold member in which the final step in the process may be accomplished.

It is to be understood that the invention herein disclosed is applicable to various forms of packing members and various materials employed in the construction of said materials.

Figure 1:
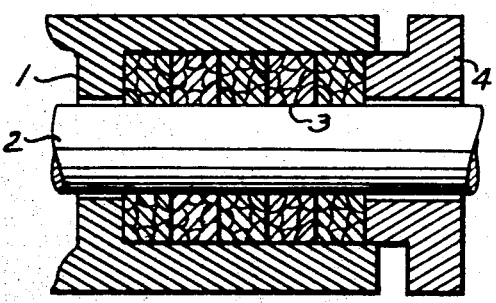
Fig. 1 is a central longitudinal section through a stuffing box employing rings treated in accordance with my invention.

In Figs. 1 to 10, inclusive, of the drawing have been shown various uses for these materials and various forms of packing materials to which the invention is applied. In Fig. 1, for example, I have shown a stuffing box 1 through which a rod 2 is adapted to move. This may be either a rotatable or reciprocating rod. Within the stuffing box and about the rod are a series of packing rings 3 shown as being made of braided material such as asbestos, said rings being held in position by a gland 4. Packing materials thus used are often submitted to action of acids and other fluids which attack the packing, and this view is illustrative of the use to which my invention may be applied.

Figure 2:
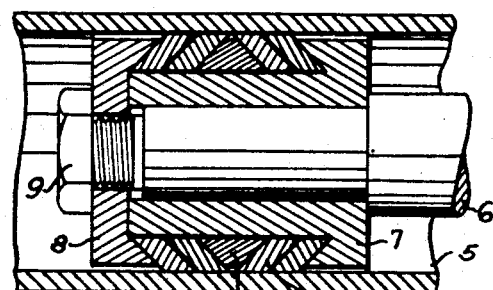
Fig. 2 is a similar section through a pump piston the rings of which may be treated as hereinafter described.

Another use is upon pistons of the character shown in Fig. 2 wherein the piston body 7 is mounted upon the piston rod 6 and is adapted to work within a cylinder 5. The packing rings 3a are preferably frusto-conical rings of fibrous material mounted in position inclined in opposite directions and with an intermediate packing ring 3b separating the frusto-conical rings. These rings are held in position mounted upon the piston by a junk ring 8 secured in position by a nut 9 upon the end of the piston rod.

Figure 3:
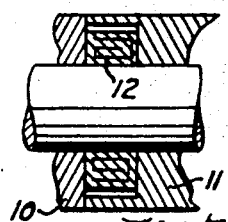
Fig. 3 is a similar broken section illustrating the type of ring which may be constructed in accordance with my invention.

In Fig. 3 a folded ring 12 is shown as mounted to pack around a rod and is held in position within a body 11 by a spacer 10.

Figure 4:
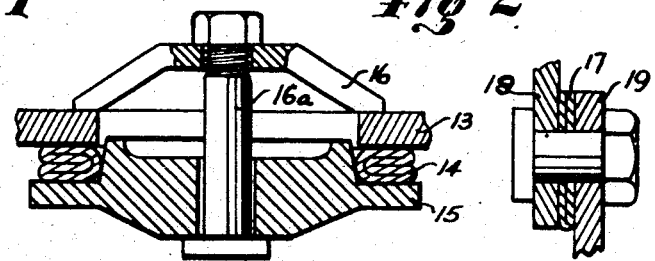
Fig. 4 shows a similar ring employed as a gasket.

A gasket 14 is shown in Fig. 4 mounted about a manhole within a plate 13 and held in packing position by a strongback 15 and a yoke 16 connected by a through bolt 16a.

Also, a packing gasket 17 folded and placed between the meeting edges 18 and 19 of a tank seam may be treated in accordance with the invention.

Figure 6:
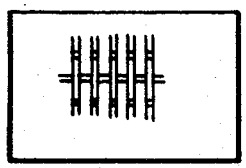
Fig. 6 is a diagrammatic view illustrating a certain weave of materials illustrating the application of my invention thereto.
Figure 7:
Fig. 7 is a broken section of a packing strip which may be treated in accordance with my invention.
Figure 7A:
Fig. 7A is a transverse section taken across the strip illustrated in Fig. 7.

In Figs. 6 to 10, inclusive, I have shown the type of material which may be treated. Thus, in Fig. 6 is illustrated the familiar basket weave adapted to single ply woven fabric. In Fig. 7 is shown a plaited square packing, shown in cross section in Fig. 7A. This type of packing is made up of a plurality of strands of yarn such as indicated in detail at 20 in Fig. 7A. I find that there are two generally important classes of porous material to which these processes may be applied. These materials are woven and braided yarns and roving. These materials are particularly adapted for treatment as will be later noted.

Figure 8:
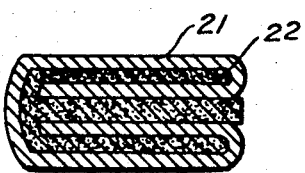
Figs. 8, 9 and 10 are transverse sections of different forms of packing material which may be employed with my method of treatment.

In Fig. 8 I have shown a folded strip of packing material 21 having a plurality of layers 22 of rubber between the folds.

Figure 9:

In Fig. 9 is a strip of packing material which may be woven fabric 23 folded in an inclined direction so as to make up a frusto-conical packing ring.

Figure 10:
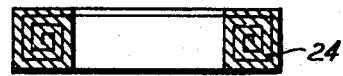

In Fig. 10 is a coiled tube of woven material 24 which when molded into form which is square in cross section makes a desirable type of packing ring for treatment with my process.

Figure 11:
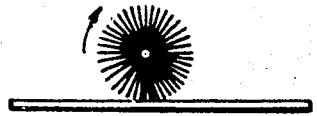
Fig. 11 shows a device whereby a packing strip may be abraded as a step in the performance of my process.

In treating materials such as are shown in Fig. 6 the strip of single ply fabric is dipped in a solution of rubber gum and then vulcanized. After thus being treated the fabric is exposed on the surface by being brushed with a wire brush such as is shown in Fig. 11. A large percentage of the fibers along the surface are thus exposed through the removal of the vulcanized rubber on the surface. I then dip or paint the packing strip with a synthetic resin solution as, for example, a phenol formaldehyde which will penetrate sufficiently to form a uniform surface protection. When thus treated the strip will not harden or crack when subjected to pressure fluids as would the resin itself. This is owing to the rubber binder which being now protected by the resinous coating will remain in a flexible condition.

In treating packing materials of this nature I have discovered that a thorough penetration of porous materials with resinous materials is not easy to effect. A slight increase in thickness of the article builds up a great resistance to penetration of viscid solutions even when applied under pressure. Resistance to penetration is also offered by the hardness and the amount of twist in the yarn making up the packing material. Also, the closeness of the weave and the porosity or absorbing ability of the material has to be taken into account.

Figure 5:
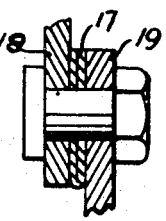
Fig. 5 illustrates a packing treated in accordance with my invention and employed as a gasket between the seams of a tank or other similar structure.
Figure 12:
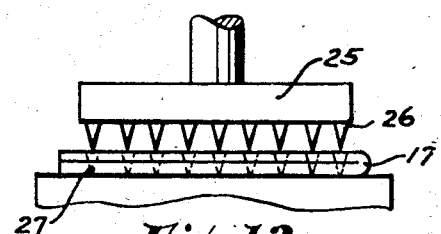
Fig. 12 is a broken detail illustrating one manner in which the material may be pierced so that the penetration thereof of protecting materials may be accomplished.

In preparing rubberized and vulcanized fibrous packing materials for the resinous treatment the packing materials must be opened up to the penetration of the resinous solution. Thus, in Fig. 12, I have shown a sheet of two-ply material which has been rubberized and vulcanized and thus adapted for use as is shown in Fig. 5. This material is pierced with a multiplicity of sharp needles or penetrating prongs which are so mounted that the prongs may be forced through the layers of vulcanized material. Pressure is exerted upon the upper tool 25 and the lower penetrating points 26 are forced downwardly through the packing strip 17. The whole surface of the packing member is thus pierced with a plurality of transverse openings illustrated at 27 in dotted lines. The spacing of the punctures in the packing material must be such that the resinous materials will flow in from one point to another through the fabric and thus be enabled to thoroughly impregnate the rubberized fabric.

Where the packing assemblies are so thick as to make it inadvisable to treat the same in the manner described openings therethrough for the admission of the resinous materials may be made by other means. In Fig. 13, for example, a frusto-conical packing ring 28 is formed with openings 29 therein by means of a small twist drill 30 mounted within a rotating chuck 31. By means of the drill a series of openings through the ring may be very rapidly made. They may be extended entirely through the ring, as shown at 32, or only part way through the ring, as shown at 33. These openings for the penetration into the ring of the resinous materials will be spaced so as to give the ring the impregnation by the resinous materials at the point where greatest resistance is desired. Thus in Fig. 13A the openings 32 are spaced more closely together around the inner portion of the ring so as to get a greater concentration of the resinous materials at that point. In a stuffing box ring such as is there shown the contact with the moving surface is along the inner side of the ring. For a piston ring used as is shown in Fig. 2, where the packing is along the outer surface of the ring, the concentration of the punctures will be greater toward the outer margin.

In impregnating the packing materials thus prepared with the resinous solution I have illustrated in Fig. 14 one apparatus which may be used. It is to be understood, however, that this is only one type of device which might be employed to carry out my invention. The packings to be treated after being prepared as already described are placed in superimposed relation upon a supporting table 34 mounted within the chamber 35 within a vat or retort 36. I have shown a plurality of rings 28, such as is shown at 13, placed upon said table 34. The resinous materials are then placed within the tank, as shown at 37, and the varnish or treating solution is then poured therein. Air pressures may be applied within the tank through the pipe 38 at the upper end of the tank and a pressure gauge 39 may be employed to indicate the amount of pressure. This pressure forces the solution into the pores of the fiber and traps what air may have been in the pores. The degree of penetration depends upon to what extent the pores are exposed and how much air has been trapped in the pores. It also depends to some extent upon the viscosity of the solution and the amount of pressure applied. I have found that pressure beyond a certain amount will not increase the penetration.

For securing a more thorough penetration and for forcing the solutions into the article in a greater amount than the volume of the available voids in the material, and thus increasing the size of the packing members, I may treat the packing as shown in Fig. 15. In this arrangement the tank or vat 36a is employed. The packing ring 28a is supported within the treating liquids 37 and the air within the tank is exhausted as far as possible by means of a suction pump 40. By thus exhausting the air, materials in the pores of the packing member will be exhausted so that there will be space for greater penetration of the material. The next step constitutes exerting pressure upon the solution about the packing by means of a pressure pump 41. By means of this pump a pressure is built up in the tank which tends to force the solution thoroughly through the pores of the materials of the ring. The action of the solution and the penetration thereof into the ring may be increased by heating the solution during the impregnation of the ring by the materials by the use of a burner 42 below the vat.

After the packing materials and particularly flat gaskets are treated in the manner stated the tenacity of the materials will be increased by placing them under pressure. In Fig. 16 I have shown a gasket such as is shown at 17 in Fig. 5 as placed between a lower supporting base 43 and an upper plate 44 upon which pressure may be exerted. When pressure is thus applied to the article placed between the parallel faces of the press the article is smoothed into a form where it can be most easily applied and the structure is more firmly impressed and refined.

Where the packing rings are to be submitted to extremely high pressures I may treat them further to increase their resistance to wear and distortion. I have found that no matter how well fabrics or materials are cemented by binders such as rubber, or how thoroughly impregnated thereafter with resinous material to fill all voids, they will collapse under service due to friction and thrust. After losing their original shape they will leak and permit pressure fluid to cut them away. To remedy this, packing materials which are submitted to heavy duty of this character may be further treated as shown in Fig. 17. The rings 28 after treatment as described are placed in a mold 45 and compressed under the action of a die 46. These molds are accurately made and designed for great strength. The temperature of the mold is raised as by means of a gas burner G below the same and the mold is maintained in closed position by heavy downward pressure indicated at P, the temperature being raised during the period when the ring is compressed and polymerization takes place completely. The ring is held in this position for the proper length of time depending upon the particular materials employed. By this step a cementation is effected by the vulcanized binder and the resinous material which increases the tenacity of the composition to a great extent. It makes possible the resistance of the packing to high pressures for long periods. Rings so processed will not collapse under any commercial pressure yet tried.

Rings and gaskets thus constructed and treated will endure under conditions where ordinary packing will be entirely impractical. I obtain a flexible packing which will endure under friction and pressure and will not deteriorate under the effects of chemicals which ordinarily render such materials inoperative. While I have used woven and braided or plaited materials as examples of packing which may be thus processed I contemplate the using of shredded or woven materials, mixtures of metals and graphite, and other packing materials having voids available for receiving the materials as heretofore described. The treatment according to my process will greatly increase the wearing life of the packing.

What is claimed as new is:

1. A process of forming packing including impregnating fibrous porous packing material with rubber, vulcanizing the same, abrading said materials so as to expose the surface fibers, puncturing the materials with small openings, and submitting said materials to the action of pressure in a bath of synthetic resinous solution.

2. A process of forming packing including impregnating fibrous porous packing material with rubber, vulcanizing the same, abrading said materials so as to expose the surface fibers, puncturing the materials with small openings, submitting said materials to the action of pressure in a bath of synthetic resinous solution, removing said materials thus treated and molding them into the desired shape under heavy pressure.

3. A process of forming packing including impregnating fibrous, porous packing material with rubber, vulcanizing the same, abrading and puncturing said material to expose the fibers thereof, exhausting the air and gas therefrom and submitting the material to a bath of synthetic resinous solution under pressure to completely cover and impregnate the exposed material.

4. A process of forming packing including impregnating fibrous, porous packing material with rubber, vulcanizing the same, abrading and puncturing said material to expose the fibers thereof, and submitting the material to a bath of synthetic resinous solution under pressure to completely cover and impregnate the exposed material.

HARLEY T. WHEELER.